United States Patent Office 3,345,200
Patented Oct. 3, 1967

3,345,200
METHOD OF PREPARING CELLULOSE FILM HAVING IMPROVED DURABILITY
John L. Justice, Wallingford, and Edward A. Wielicki, Philadelphia, Pa., and Anthony Labriola, Pennsville, N.J., assignors to FMC Corporation, Philadelphia, Pa., a corporation of Delaware
No Drawing. Filed Feb. 26, 1964, Ser. No. 347,363
5 Claims. (Cl. 117—60)

ABSTRACT OF THE DISCLOSURE

A method for the preparation of cellulose film having improved durability is disclosed herein. In general, the water of a water-wet film is replaced with a water-soluble organic solvent and the film, in this condition, is plasticized with an organic plasticizer for cellulose dissolved in said water-soluble solvent. The solvent is then removed to provide a film of comparatively higher durability.

---

Physical properties of conventionally prepared regenerated cellulose film are adequate for most purposes. However, as in the case of packaging materials subjected to repeated stresses, particularly under extreme temperature conditions, it is desirable to increase the durability of cellulose film.

It is an object of this invention to provide a cellulose film having increased durability.

It is another object of this invention to provide a method of producing a regenerated cellulose film having increased durability.

These and other objects are accomplished in accordance with this invention in a method comprising first replacing water in a water wet regenerated cellulose film with a water-soluble organic solvent in which organic plasticizers for cellulose are soluble, then treating the film with an organic plasticizer for cellulose dissolved in said organic solvent, and removing the solvent from the film. The resulting film is unexpectedly more durable than films plasticized in the conventional manner.

The regenerated cellulose film of the invention is preferably prepared by coagulating viscose extruded in the form of a film. However, cellulose films prepared, for example, by the cuprammonia process or by the de-esterification of cellulose ester films are suitably employed. It is also preferable that a film is used in the never-dried state, i.e., film which is still wet from the manufacturing process used to make it, although re-wet film produces satisfactory results in this process.

The water in the film is replaced by treating it in a bath or by other suitable means with a water-soluble organic solvent for organic plasticizers for cellulose. These solvents include, for example, monohydric alcohols having 1 to 4 carbon atoms; volatile ethers including dioxane, tetrahydrofuran and dioxolane; low molecular weight aliphatic acids including acetic acid; low molecular weight amines including propylamine and isopropylamine; and low molecular weight ketones including acetone. Of the above solvents isopropanol is preferred on the basis of convenience and availability.

Plasticizers for regenerated cellulose film are conventional and include, for example, glycerol, ethylene glycol, polyethylene glycol, propylene glycol, polypropylene glycol, 1,3-butylene glycol, 1,3-propanediol, urea, trimethylamine hydrochloride, etc. Any material which is an effective plasticizer for cellulose and soluble in a suitable solvent may be used. Glycerol is preferred on the basis of cost and availability.

The plasticizer is dissolved in the solvent for application to the film at a concentration of from about 0.5 to about 10% and preferably from about 1 to about 5% based on the weight of the solution.

The following example is set forth to demonstrate the invention.

Example

Sheets of wet gel (never-dried) regenerate cellulose were treated in several baths of isopropanol to displace water. The films were then treated in a 2.5 wt. percent solution of glycerol in isopropanol for several minutes and then dried in clamping frames. The dried films were found to contain 16 grams of glycerol per 100 grams of cellulose. This is compared to conventionally plasticized regenerated cellulose sheets where a 5 wt. percent solution of glycerol in water yields a sheet containing 14 grams of glycerol per 100 grams cellulose.

Durability was measured by forming bags containing lead shot of the films to be tested. Each bag was placed in a wide-mouth jar containing a baffle positioned so that when the jar was placed on a set of ball mill rolls, the bag was repeatedly lifted by the baffle and dropped on operation of the rolls. The time period was measured from the start of the rolls to the point at which the bag ruptured. The closed jar permitted testing of films at controlled moisture content and temperature. The results of this test on the films as prepared in the above example and on films plasticized in the conventional manner are compared below.

FILMS PRECONDITIONED AT 43% R.H. AND 25° C.

| Plasticizer Solution | Plasticizer in film, g./100 g. cellulose | Test Results (Sec.) | |
|---|---|---|---|
| | | At 0° C. | At −30° C. |
| 2.5% glycerol in isopropanol | 16 | 176 | 60 |
| 5% glycerol in water | 14 | 120 | 2 |

An improvement of 56 seconds at 0° C. and 58 seconds at −30° C. is unexpectedly high even when the higher plasticizer content of the improved film is taken into account.

Various changes and modifications may be made practicing the invention without departing from the spirit and scope thereof and, therefore, the invention is not to be limited except as defined in the appended claims.

We claim:
1. A method of preparing durable cellulose film which comprises first displacing substantially all of the water in a water wet regenerated cellulose film with a water-soluble organic solvent in which organic plasticizers for said cellulose are soluble, then treating said film with an organic plasticizer for said cellulose dissolved in said organic solvent in an amount sufficient to plasticize said film, and removing said solvent from the film.

2. The method of claim 1 wherein the organic solvent is a monohydric alcohol having from 1 to 4 carbon atoms.

3. The method of claim 2 wherein the monohydric alcohol is isopropanol.

4. The method of claim 1 wherein the organic plasticizer is glycerol dissolved in the organic solvent at a concentration of from about 0.5 to about 10% based on the weight of the solution.

5. A method of preparing durable cellulose film which comprises first displacing substantially all of the water in a wet-gel regenerated cellulose film with isopropanol, then treating the film with glycerol dissolved in isopropanol at a concentration of from about 1 to about 5% based on the weight of the solution, and removing the isopropanol from the film.

References Cited

UNITED STATES PATENTS

| 1,961,268 | 6/1934 | Voss | 264—343 |
| 2,006,661 | 7/1935 | Voss | 106—168 X |
| 2,087,008 | 7/1937 | Snyder | 117—144 |
| 2,226,554 | 12/1940 | Drew | 117—144 |
| 2,281,513 | 4/1942 | Reichel et al. | 117—144 X |
| 2,321,762 | 6/1943 | McDermott | 117—144 X |
| 3,000,763 | 9/1961 | Anderson et al. | 117—114 |

FOREIGN PATENTS 504,566   4/1939   Great Britain.

WILLIAM D. MARTIN, *Primary Examiner.*

M. LUSIGNAN, *Assistant Examiner.*